United States Patent [19]
Etter

[11] 3,859,632
[45] Jan. 7, 1975

[54] DIGITAL INPUT SCANNER GUIDANCE SYSTEM

[75] Inventor: Gary Etter, Kingston, N.Y.

[73] Assignee: International Business Machines Corporation, Armonk, N.Y.

[22] Filed: Dec. 26, 1972

[21] Appl. No.: 318,076

[52] U.S. Cl. ........ 340/146.3 SY, 35/35 E, 35/35 R, 235/61.11 E
[51] Int. Cl. .......... G06k 7/10
[58] Field of Search .............. 235/61.11 E, 61.12 R; 35/9 A, 9 B, 9 C, 9 D, 9 H, 35 R, 35 A, 35 B, 35 C, 35 E, 35 H, 35 J; 340/146.3 Z, 146.3 R

[56] References Cited

UNITED STATES PATENTS

| | | | |
|---|---|---|---|
| 2,548,011 | 4/1951 | Frost | 35/35 A |
| 3,526,755 | 9/1970 | Campbell et al. | 235/61.11 E |
| 3,541,706 | 11/1970 | Shapiro | 35/35 A |
| 3,659,357 | 5/1972 | Martinesco et al. | 35/35 C |
| 3,735,350 | 5/1973 | Lemelson | 235/61.11 E |

*Primary Examiner*—Gareth D. Shaw
*Assistant Examiner*—Leo H. Boudreau

[57] ABSTRACT

Apparatus for guiding a sensor along a scan path in registration with coded information on a document being scanned. A guide layer having internal guiding edges is provided for guiding the scanning sensor. Two guide layers are attached at their external edges for forming a pocket into which documents to be scanned can be inserted and scanned on two surfaces. A hinge is provided at an external edge of the pocket for mounting the pocket into a book-like structure.

2 Claims, 4 Drawing Figures

DIGITAL INPUT SCANNER GUIDANCE SYSTEM

BACKGROUND OF THE INVENTION

1. Field of the Invention

The apparatus of the instant invention relates to digital system data input stations and more specifically to means for guiding hand-held sensors so as to enable scanning of an input document.

2. Description of the Prior Art

Freehand scanning of specially printed bar codes having relatively long vertical bars and relatively wide spacing between bars are known. When it is desired to print relatively large amounts of bar coded input information on input documents, much shorter and more closely spaced bars must be used. Under these conditions, sensor skew and sensor scanning path deviation from the printed line of bar coded information become a problem. For example, sensor skew might result by the sensor being rotated within the fingers of the operator. The freehand scanning path also will likely assume an arcuate shape which is not registered with the straight line of bar coded information at all points. For example, when bar coding is printed at a height of 0.125 inches and a spacing of 0.008 inches, sensor skew of 10° or more will cause reading errors. The sensitivity to skew is due to the special sensory configuration which is needed in order to compensate for the varying velocities and accelerations of hand scanning.

Hand-held sensors adapted to follow grooves are known in the area of reading and writing devices for the blind and also in language education devices. None of these applications of hand-held scanning devices suffer from the skew problems hereinbefore mentioned, however, and therefore their teachings are not applicable to the problem overcome by the instant invention.

Furthermore, those guidance sytems of the prior art which control skew to some degree have suffered from binding between the sensor and guide groove. Alternately where the binding has been solved by curved shaping of the groove and guide means, vertical control at the groove has been sacrificed. Therefore, more expensive optics with increased depth of field would be required in the optical sensor.

SUMMARY OF THE INVENTION

It is an object of this invention to improve digital systems data input by coaction between a scanning sensor and a guide layer registered with coded information to prevent sensor skew and scanning path deviation with respect to lines of coded information.

It is a further object of this invention to provide a pocket into which an input document is inserted, the pocket providing for registration of the document with respect to scan paths defined by guide layers of which the pocket is formed.

It is an even further object of this invention to provide a document holder having the form of a pocket to register and hold a document for scanning by a sensor coacting with internal guide edges of a guide layer, the pocket having a hinge along one external edge for mounting the pocket into a book-like structure at a digital systems data input station.

A still further object of this invention to provide a protective layer between the document and the sensor thereby preventing obliteration of the coded information which was printed using conventional typing or printing apparatus.

These and further objects which will become apparent upon reading the specification and drawings are accomplished by providing a guide layer having internal guide surfaces which is placed in registration with lines of information to be scanned. A sensor having parallel guide means for engagement with the internal guide surfaces is then drawn along the internal guide surfaces to scan a line of information between said surfaces without allowing skew or scan line deviation to affect reading reliability.

DESCRIPTION OF A PREFERRED EMBODIMENT OF THE INVENTION

Figure 1:
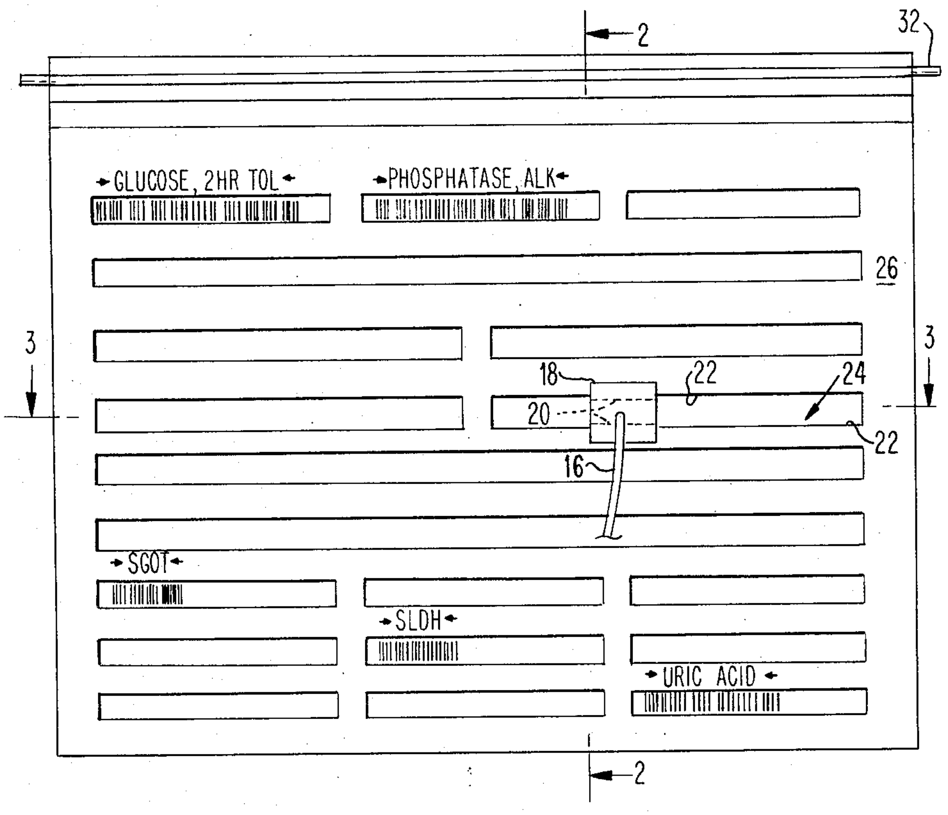
FIG. 1 shows a front view of a document in a document holding pocket formed by two guide layers attached at their external edges and the cooperating sensor.

The digital input scanner guidance system of the invention finds particular utility in a terminal communication system such as a hospital terminal communications system where a large number of standardized messages are handled. In a hospital terminal communications system of the example shown in the drawings, high density bar coded standard messages are printed on input documents 28 called menus for hand scanning. In this manner, keyboard entry of messages which requires a certain amount of operator skill and is subject to human error can be minimized.

For example, an input document might be a prescription menu at a nursing data input station or pharmacy data input station, or a standard result menu at a laboratory input station within a hospital terminal system. An example of the face of a prescription menu document 28 is shown as seen through transparent protection and guidance layers in FIG. 1 and is shown in cross section in FIGS. 2 and 3. Referring again to the upper left hand portion of FIG. 1, an example standard message "glucose, 2HR TOL" is shown in human readable form as seen through transparent guidance layer 26 and transparent protective layer 30. The machine readable bar coded equivalent of the foregoing message appears directly below the message in FIG. 1 as seen through transparent protective layer 30.

Figure 2:
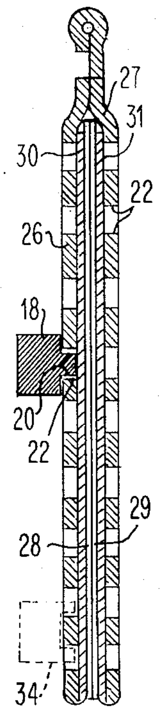
FIG. 2 shows a vertical cross section view of the document holder and sensor of FIG. 1. Thickness is exaggerated to aid clarity.
Figure 3:
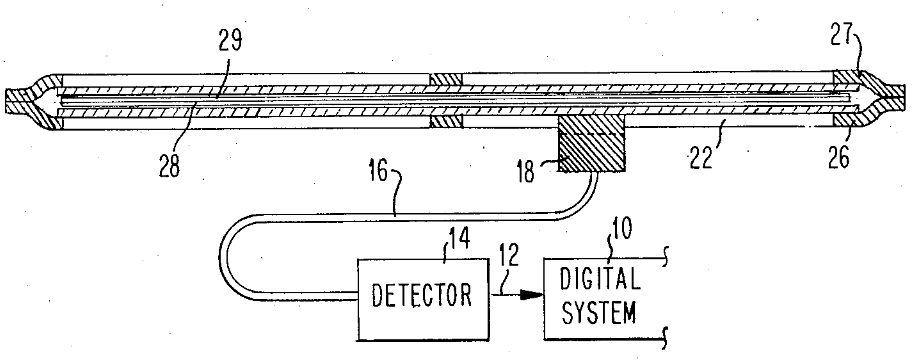
FIG. 3 shows a horizontal cross section view of the document holder and sensor of FIG. 1. Thickness of the documents and document holder is exaggerated to more clearly show relationship of the sensor to the guide layer.

Referring now to FIG. 3, a digital system 10 is shown having an input 12 for receiving coded information detected by detector 14. Detector 14 is connected to a hand-held sensor 18 by a cable 16 for receiving analog signals therefrom representing variations in intensity of light reflected from document 28 to a photo detector as scanner 18 is manually pulled along a line of bar coded information on document 28. In order to insure that sensor 18 follows the line of coded information on document 28 without substantial deviation or skew, sensor 18 has parallel guide surfaces 20 as shown in FIGS. 1 and 2 which coact with internal surfaces 22 of a guide layer 26 registered over document 28. Although pairs of parallel internal surfaces 22 define sides of apertures 24 in guide layer 26 of the instant embodiment, it will be recognized by those skilled in the art of mechanical design that guide layer 26 and protective layer 30 could be formed as one piece wherein parallel internal surfaces 22 would define sides of a flat bottomed groove. Referring again to FIG. 1, it can be seen that each pair of parallel internal surfaces 22 define a scan path lying between them and registered over lines of coded information on document 28. Improved resistance to skew of sensor 18 with respect to the scan path results from the location of the scan line between the pair of internal surfaces 22 which define the scan path.

The utility of the guide system of the invention is further improved by providing a backing layer or second guidance layer 27 attached to guidance layer 26 at least along one external edge as shown in FIG. 2. The line of attachment between layers 26 and 27 forms a registration line against which the top of document 28 is registered to orient lines of coded information parallel to and under scan paths defined by internal surfaces 22 of guide layer 26. Additional external edges of guide layer 26 and layer 27 can be attached as shown in FIG. 3 thereby forming a pocket into which a document 28 can be inserted for registration and scanning. It is most desirable that layer 27 comprise a second guide layer also having pairs of internal surfaces 22. In this configuration, lines of coded information can be scanned from both sides of document 28 or from each face of back to back oriented documents 28 and 29.

A further improvement in the utility of the instant invention is achieved by providing a hinge along an external edge of attachment between layer 26 and 27 such as the top edge to allow the pocket containing the document 28 to be mounted into a book-like structure so that a plurality of documents 28 can be conveniently located at a digital system data input station. Although a pin type hinge 32 is shown in FIGS. 1 and 2, it is well recognized that a plurality of apertures along one edge for insertion into a ring binder will serve the same purpose and should be deemed to be an equivalent thereof.

Furthermore, although the cross section of sensor 18 as shown in FIG. 2 contemplates guide surfaces 20 lying between internal surfaces 22, the invention will operate equally as well in the reverse configuration as shown at the lower portion of FIG. 2 werein a sensor 34 is shown in phantom lines. It will be noted that the position of the lines of bar coded information must be registered between the parallel sides of adjacent apertures in order to be scanned by sensor 34. Furthermore, guide layer 26 must be transparent in order to allow light from a light source within sensor 34 to pass through guide layer 26 and be reflected with varying intensity to a photo sensor within sensor 34 as sensor 34 is scanned along a line of bar coded information. It will also be noted by reference to FIG. 2 that in the reverse configuration guide layer 26 acts as a protective layer to protect lines of bar coded information lying between adjacent apertures from being obliterated or smeared by wear from sensor 34.

Figure 4:
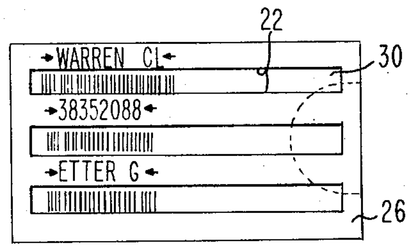
FIG. 4 shows an alternate application of the invention in the form of an identification card holder to facilitate scanning of the identification card at a digital system data input station.

An alternate application of the system of the invention is shown in FIG. 4 in the form of an identification card holder. In operation, the nurse, pharmacist, or lab technologist would identify himself as an authorized operator to the hospital terminal system by hand scanning his portable identification card contained within the card holder.

While the invention has been shown and described with reference to particular embodiments thereof and with respect to particular applications thereof, it will be understood by those skilled in the art that various changes in form and detail in addition to those changes suggested in the designation may be made therein without departing from the spirit and scope of the invention.

For example, although the invention was applied to manual scanning of bar coded information, the invention is not limited to the form of the information being scanned and will work as well with other forms of information including alphabetical information as in optical character recognition.

What is claimed is:

1. A document holding scan guide pocket and coacting optical sensor for assisting persons without special skills in data entry, to manually enter bar encoded standardized messages from a menu document, said messages being repeated on adjacent lines in human readable alphanumeric form, wherein the improvement comprises:

a pair of transparent guide layers attached to each other along three external edges for defining a pocket into which a document may be inserted, at least one of the attached external edges providing registration of said document within said pocket, each of said guide layers further comprising a plurality of parallel rectangular apertures defining scan paths therebetween and registered over lines of information on said document;

a hand-held sensor having parallel internal guide surfaces for engagement with parallel internal surfaces of two adjacent apertures of one of said guide layers to guide said sensor along said scan paths between said adjacent apertures while preventing substantial angles of rotation of said sensor with respect to said scan path;

a pair of transparent protective layers located between said guide layers, each of said protective layers being attached to one of said guide layers for protecting a document contained within said pocket.

2. A document holding scan guide pocket and coacting optical sensor for assisting persons without special skills in data entry, to manually enter bar encoded standardized messages from a menu document, said messages being repeated on adjacent lines in human readable alphanumeric form, wherein the improvement comprises:

a pair of transparent guide layers attached to each other along three external edges for defining a pocket into which a document may be inserted, at least one of the attached external edges providing registration of said document within said pocket, and a hinge pin incorporated into one of the attached external edges to facilitate insertion of said pocket into a book; each of said guide layers further comprising apertures having pairs of parallel internal guide surfaces defining scan paths therebetween and registered over lines of information on said document;

a hand-held sensor having parallel external guide surfaces for engagement with said internal surfaces of said guide layers to guide said sensor along said scan paths while preventing substantial angles of rotation of said sensor with respect to said scan paths;

a pair of transparent protective layers located between said guide layers, each of said protective layers being attached to one of said guide layers for protecting a document contained within said pocket.

* * * * *